(12) United States Patent
Betts (10) Patent No.: US 9,227,107 B2
(45) Date of Patent: Jan. 5, 2016

(54) HAND EXERCISE DEVICE (71) Applicant: Sarah Elizabeth Betts, Minneapolis, MN (US)

(72) Inventor: Sarah Elizabeth Betts, Minneapolis, MN (US)

(*) Notice: Subject to any disclaimer, the term of this patent is extended or adjusted under 35 U.S.C. 154(b) by 249 days.

(21) Appl. No.: 13/952,328

(22) Filed: Jul. 26, 2013

(65) Prior Publication Data
US 2014/0187385 A1    Jul. 3, 2014

Related U.S. Application Data

(60) Provisional application No. 61/747,950, filed on Dec. 31, 2012.

(51) Int. Cl.
| | |
|---|---|
| G09B 15/06 | (2006.01) |
| A63B 23/16 | (2006.01) |
| A63B 21/04 | (2006.01) |
| A63B 21/055 | (2006.01) |
| A63B 23/035 | (2006.01) |
| A63B 21/00 | (2006.01) |
| A63B 71/06 | (2006.01) |

(52) U.S. Cl.
CPC ............ *A63B 23/16* (2013.01); *A63B 21/0414* (2013.01); *A63B 21/0552* (2013.01); *A63B 23/03508* (2013.01); *G09B 15/06* (2013.01); *A63B 21/1469* (2013.01); *A63B 2071/0694* (2013.01)

(58) Field of Classification Search
CPC ..... A63B 23/16; A63B 21/0414; G09B 15/06
See application file for complete search history.

(56) References Cited

U.S. PATENT DOCUMENTS

| | | | | | |
|---|---|---|---|---|---|
| 351,111 | A | * | 10/1886 | Kasper | 84/465 |
| 906,612 | A | * | 12/1908 | Cayton | 84/291 |
| 1,126,938 | A | * | 2/1915 | Barrett | 84/468 |
| 1,136,481 | A | * | 4/1915 | Ostrovsky | 84/465 |
| 2,977,835 | A | * | 4/1961 | Hornseth | 84/275 |
| 3,038,363 | A | * | 6/1962 | Miessner | 84/733 |
| 3,403,590 | A | * | 10/1968 | Quinton | 84/470 R |
| 3,447,415 | A | * | 6/1969 | Kime | 84/465 |
| 3,871,646 | A | * | 3/1975 | Slack | 482/48 |
| 3,981,219 | A | * | 9/1976 | Johns | 84/275 |
| D244,103 | S | | 4/1977 | Greer | |
| 4,031,801 | A | * | 6/1977 | Cecchini | 84/465 |
| 4,065,995 | A | * | 1/1978 | Greer | 84/465 |
| 4,364,298 | A | * | 12/1982 | Piazza | 84/465 |
| 4,559,861 | A | * | 12/1985 | Patty et al. | 84/470 R |
| 4,580,479 | A | * | 4/1986 | Bonanno | 84/626 |
| 4,765,219 | A | * | 8/1988 | Alm | 84/726 |
| 5,756,914 | A | | 5/1998 | Streibl | |
| 5,811,704 | A | * | 9/1998 | Anderko | 84/470 R |
| D403,012 | S | | 12/1998 | Anderko | |
| 5,952,595 | A | * | 9/1999 | Carnell | 84/465 |
| 6,127,615 | A | * | 10/2000 | Rosenberg | 84/465 |

(Continued)

*Primary Examiner* — Robert W Horn
(74) *Attorney, Agent, or Firm* — Fredrikson & Byron, P.A.

(57) ABSTRACT

A hand exercise device comprising a base with a generally planar surface, and at least one string held at a substantial angle of inclination with respect to the planar surface of the base. The hand exercise device can be adapted to perform hand exercises that involve applying a pushing force to move the string such that the string is in contact with the planar surface of the base. The hand exercise device can be modified to include a plurality of strings of different thicknesses held at a substantial angle of inclination to facilitate variable exercise resistance. The hand exercise device can benefit patients by increasing grip strength, improving hand function, and/or alleviating joint pain.

15 Claims, 11 Drawing Sheets

(56) References Cited

U.S. PATENT DOCUMENTS

| | | | |
|---|---|---|---|
| 6,179,750 B1 * | 1/2001 | Lonergan | 482/47 |
| 6,911,011 B2 * | 6/2005 | Haag | 601/40 |
| 7,064,260 B2 * | 6/2006 | Willard | 84/465 |
| D529,092 S | 9/2006 | Ambrose, Sr. | |
| 7,157,633 B1 | 1/2007 | Kopesec | |
| 7,230,175 B2 * | 6/2007 | Whiteside | 84/465 |
| 7,262,354 B2 | 8/2007 | Orred et al. | |
| 7,304,224 B1 * | 12/2007 | Bettis et al. | 84/293 |
| D574,037 S * | 7/2008 | LeGrady | D17/20 |
| 8,124,863 B2 * | 2/2012 | Van Wagoner | 84/293 |
| 8,324,489 B1 * | 12/2012 | Chapman | 84/314 R |
| 8,618,398 B2 * | 12/2013 | Van Wagoner et al. | 84/465 |
| D723,098 S * | 2/2015 | Roebke | D17/14 |
| 8,975,501 B2 * | 3/2015 | Roebke | G10H 3/18 84/615 |
| 2003/0131710 A1 * | 7/2003 | Goldiner | 84/265 |
| 2013/0180384 A1 * | 7/2013 | Van Wagoner et al. | 84/485 R |
| 2014/0187385 A1 * | 7/2014 | Betts | 482/44 |

* cited by examiner

HAND EXERCISE DEVICE

PRIORITY CLAIM

The present application claims priority to U.S. Provisional Patent Application Ser. No. 61/747,950 filed Dec. 31, 2012, the disclosure of which is hereby incorporated by reference in its entirety.

FIELD OF THE INVENTION

The present invention generally relates to a hand exercise device for improving strength, function, and/or pain.

BACKGROUND OF THE INVENTION

Arthritis is a public health challenge, affecting approximately 50 million people in the United States. Arthritis has been the most common cause of disability in the United States for the past 15 years and costs the U.S. economy an estimated $128 billion annually. Rheumatoid arthritis is a systemic disease characterized by inflammation of membranes that line joints and is accompanied by severe pain and joint damage. Osteoarthritis is the most common form of arthritis and is characterized by progressive breakdown of joint cartilage. Osteoarthritis often results in degenerative damage to joints of the hand. Endurance and resistance types of exercise have been shown to provide considerable disease-specific benefits for people with osteoarthritis and rheumatoid arthritis. Muscle strengthening exercises can help support the joints, improve function and/or joint pain, and facilitate maintaining bone strength without hurting the joints.

Users can improve strength, function, and/or joint pain in their hands by performing endurance and resistance types with a hand exercise device. An example hand exercise device may include a compressible surface such as a sphere made of a flexible material such as polyurethane, neoprene, silicone, or latex. A user holds the exercise device in their palm to apply a compressive force on the surface of the sphere. The sphere offers resistance to the compressive force applied by the user because of elastic properties of the material of the sphere. The exercise comprises repetitive application and removal of the compressive force on the surface of the sphere.

Another example of a hand exercise device may include compression springs instead of or in addition to a natural or engineered surface that offers resistance against a compressive force due to material elastic properties. One or more compression springs may be supported by a surface. A second surface may be supported by the compression springs. A user may apply a compressive force to perform hand exercises. The compression springs offer resistance to the applied compressive force. The exercise may comprise a specific number of repetitions of applying the compressive force on the surface. The user may disassemble the hand exercise device and replace the compression springs with another set of compression springs that offer more or less resistance to the applied compressive force.

Another example of a hand exercise device may include bands made of a polymer with elastomeric properties such as neoprene, silicone or latex supported by two support posts. One of the support posts is fixed, while the other support post may be moved by applying a tensile or pulling force on the support post. The movable support post transfers the applied pulling force to the elastomeric bands which may offer resistance to the applied pulling force. The exercise may comprise applying the pulling force on the movable support post for a specific number of repetitions.

Hand exercise devices that do not offer variable exercise resistance and precise finger flexion may not result in measurable improvement in joint strength and pain reduction. Hand exercise devices that include variable exercise resistance may have many parts and components that must be disassembled to replace the parts that offer exercise resistance. Such hand exercise devices may not encourage the user to exercise regularly. Disassembly of parts and replacement of exercise surfaces may also increase the cost of the hand exercise devices. Hand exercises that include applying a precise force using specific areas of the hand offers muscle flexion and can improve finger and hand strength while mitigating joint pain. Such exercises may be more beneficial than exercises that involve pushing or squeezing a compression surface because of the precision involved in applying a pushing force on a string, as opposed to an exercise surface.

SUMMARY

Certain embodiments of the present invention relate to a hand exercise device. The hand exercise device may include a base, a plurality of fasteners supported by the base and at least one string. The string can be connected to the base by the fasteners such that the string remains in tension. The string can be supported by a support bridge coupled to the base. The support bridge is positioned such that one or more strings are disposed at a substantial angle of inclination with respect to a generally planar surface of the base. The angle of inclination can be approximately between 4 degrees and 75 degrees. The strings can be of a material with sufficient elasticity. The elasticity of the strings facilitate the return of a string from a final position to an initial position, when a force is applied that moves the first and second strings from the initial position to a final position.

Various embodiments of the present invention can include a support bridge with grooves or slits to receive the strings. The strings can be of different thicknesses to vary exercise resistance. The strings can have same string tension, but offer varying exercise resistance. The hand exercise device can include one or more bumpers positioned on a generally planar surface of the base. A flared portion to provide increased support can also be included in the hand exercise device. The hand exercise device can have any shape that would encourage users to perform regularly. For instance, it can be shaped like a stringed musical instrument. The hand exercise device can include one or more exercise lanes positioned on a planar surface of the base for performing hand exercises.

BRIEF DESCRIPTION OF THE DRAWINGS

The following drawings are illustrative of particular embodiments of the invention and therefore do not limit the scope of the invention. The drawings are not necessarily to scale (unless so stated) and are intended for use in conjunction with the explanations in the following detailed description. Embodiments of the invention will hereinafter be described in conjunction with the appended drawings, wherein like numerals denote like elements.

DETAILED DESCRIPTION

Figure 1:
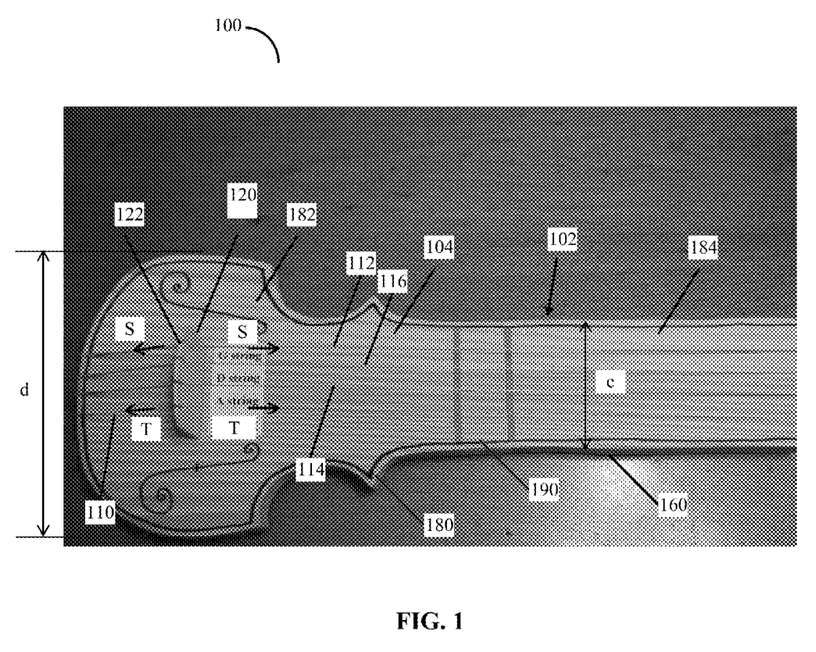
FIG. 1 is an upper perspective view of an exemplary hand exercise device according to the present invention.
Figure 2:
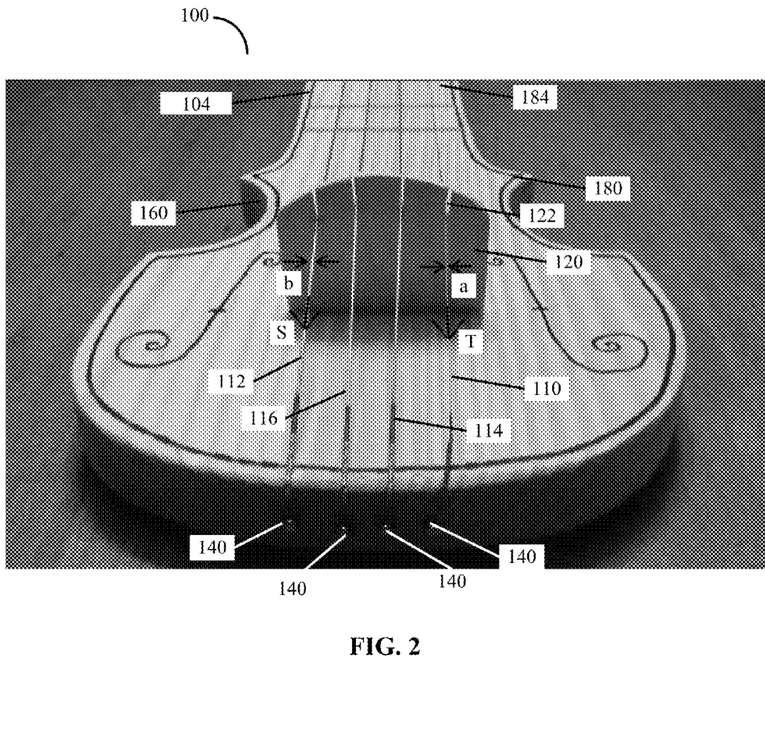
FIG. 2 is a left side perspective view of the exemplary hand exercise device of FIG. 1.

FIGS. 1-2 illustrate an exemplary embodiment of a hand exercise device 100. The hand exercise device 100 comprises a base 102, a plurality of fasteners 140 supported by the base 102, a first string 110 connected to the base 102 by the fasteners 140 and a support bridge 120 coupled to the base 102. The hand exercise device 100 can be of a size and shape that facilitates ease of use. The hand exercise device 100 can be fabricated from materials such as solid wood (E.g.: pine board). Similar materials such as plastic that provide suitable support and ease of portability can be used without loss of functionality.

The base 102 can include a generally planar first surface 104, a generally planar second surface 106 and a third surface 160. The generally planar first surface 104 and the generally planar second surface 106 can be parallel to each other. The third surface 160 of the base 102 can be located laterally to the generally planar first surface 104 and the generally planar second surface 106 of the base 102. In the illustrated embodiment shown in FIG. 1, the base 102 is shaped like a stringed musical instrument. It can be appreciated that the shape of the base 102 does not limit the scope of the application, and the base 102 may include other shapes such as rectangle or oval. Any shape that facilitates ease of use of the hand exercise device 100 may be suitable. The base 102 can be fabricated by cutting or sawing materials such as wood. Molded plastic can also be used to fabricate the base 102. The base 102 can have a length "L". In the illustrated embodiment, the length "L" of the base 102 is 37 centimeters and the thickness is 1.9 centimeters. The width of the base 102 is 14.6 centimeters at the widest part of the device, and 6.4 centimeters at its narrowest part of the device.

Figure 3:
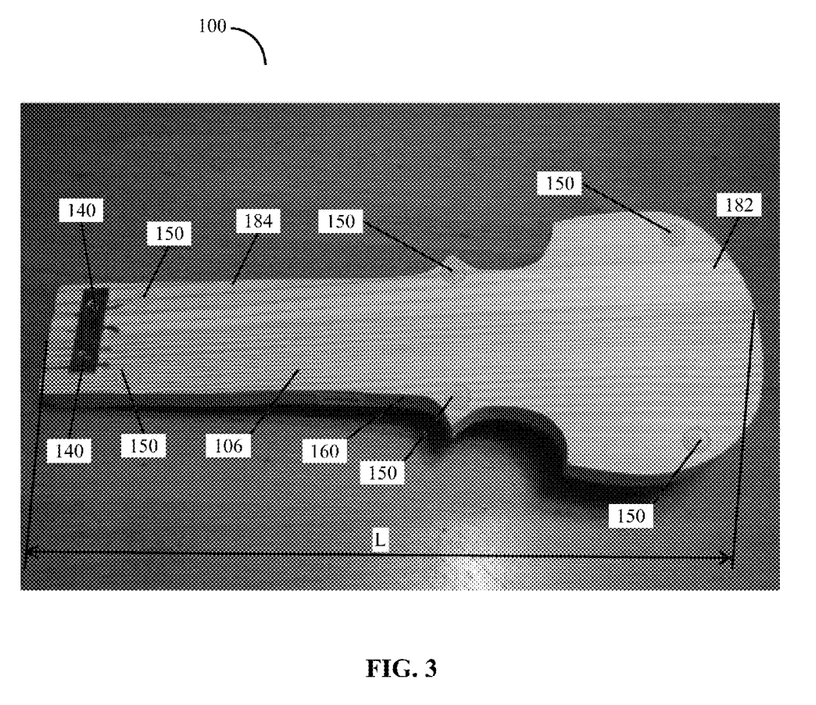
FIG. 3 is a bottom perspective view of the exemplary hand exercise device of FIG. 1.

The fasteners 140 can include any means of fastening the first string 110 to the base 102. The fasteners 140 can be nails or wood screws if the base 102 is fabricated from a wooden board. In the illustrated embodiment shown in FIG. 2, steel nails of 1.6 centimeters in length and 3.2 millimeters in diameter are used. As shown in FIG. 3, the fasteners 140 include a plate and wood screws to secure the first string 110 to the base 102. In the illustrated embodiment shown in FIG. 3, the plate is fabricated of zinc and is of length 5.1 centimeter. The wood screws are of length 1.6 centimeters. The fasteners 140 can also be adhesive strips or hook-and-loop or similar connectors that can be used to couple the first string 110 to the base 102. The base 102 can be fabricated from materials of similar rigidity as wood. As mentioned earlier, a material such as plastic can also be used to fabricate the base 102. In such an embodiment, suitable fasteners that can engage the first string 110 with the base 102 such as adhesives, plastic screws or similar connectors can be employed.

The support bridge 120 can be fabricated from wood, plywood or similar materials and is positioned on the generally planar first surface 104 of the base 102. The support bridge 120 can have a height "h" measured from the generally planar first surface 104. In the illustrated embodiment shown in FIG. 4, the height "h" of the support bridge 120 is 3.2 centimeters. The support bridge 120 in the illustrated embodiment is of a length 5.1 centimeters and thickness 0.6 centimeters. The support bridge 120 can be coupled to the base 102 by adhesives, mechanical fasteners or any other means known in the arts. The support bridge 120 can also be fabricated as a single component together with the base 102. In some embodiments, the base 102 can have a projection that serves as the support bridge 120.

Figure 6:
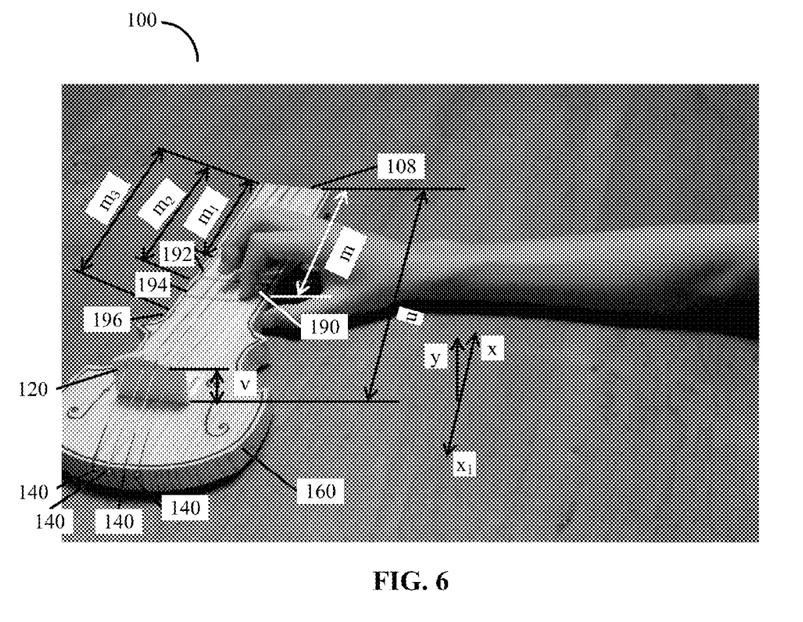
FIG. 6 is an upper perspective view of the exemplary hand exercise device of FIG. 1.
Figure 7:
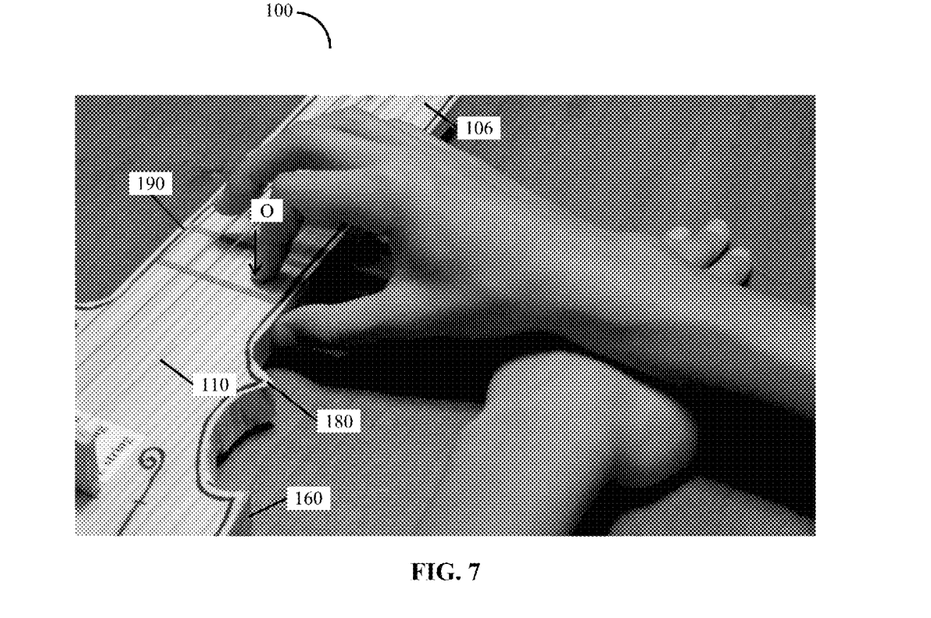
FIG. 7 is an upper perspective view of the exemplary hand exercise device of FIG. 1.
Figure 8:
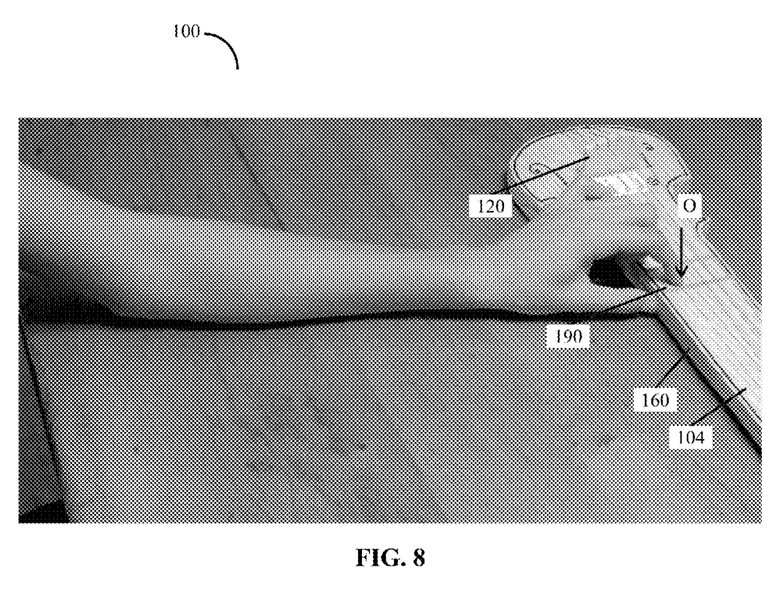
FIG. 8 an upper perspective view of the exemplary hand exercise device of FIG. 1.
Figure 9:
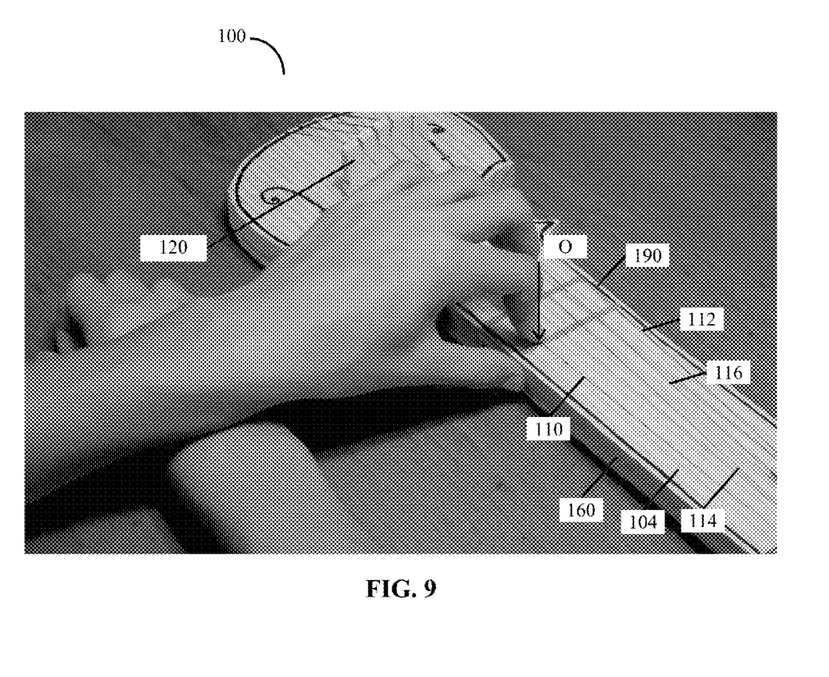
FIG. 9 is an upper perspective view of the exemplary hand exercise device of FIG. 1.
Figure 10:
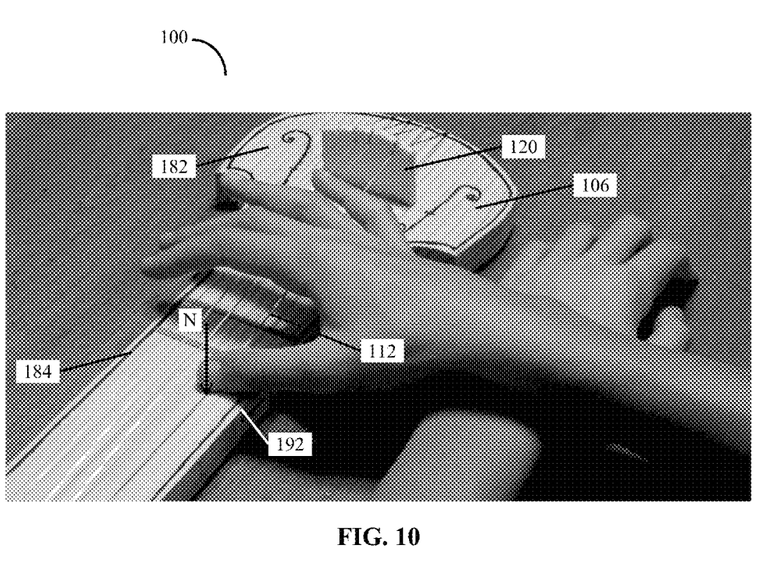
FIG. 10 is an upper perspective view of the exemplary hand exercise device of FIG. 1.

As best seen in FIG. 6, the support bridge 120 can be positioned at a distance "u" from an edge 108 of the base 102 in a first direction "x" such that at this location measured along the first direction, the first string 110 is held at a distance "v" from the generally planar first surface 104 of the base 102 in a second direction "y". In the illustrated embodiment, the distance "u" is approximately 31 centimeters from the edge 108 along direction "x", and the distance "v" is between approximately 2.69 centimeters and approximately 3.175 centimeters from the planar first surface 104 along direction "y".

The first string 110 has a first string thickness "a". The first string 110 can be configured to develop a first string tension "T" when connected to the base 102 by the fasteners 140. The first string tension "T" can be a property of the material used for fabricating the first string 110. The first string 110 can be positioned such that the first string is at a distance "v" from the generally planar first surface 104 of the base 102 in the second direction "y". The distance "v" in the second direction "y" is measured at the distance "u" from the edge 108 in the first direction "x". The first direction "x" and second direction "y" are separated by an angle of approximately 90 degrees.

Figure 4:
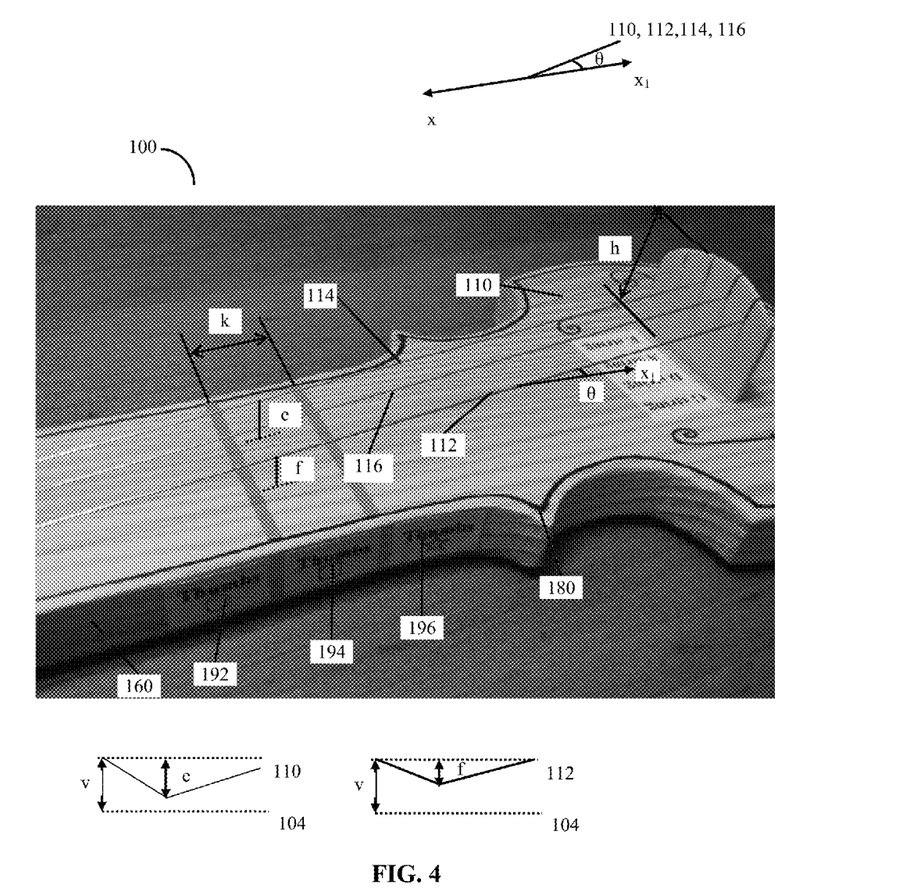
FIG. 4 is an upper perspective view of the exemplary hand exercise device of FIG. 1.
Figure 5:
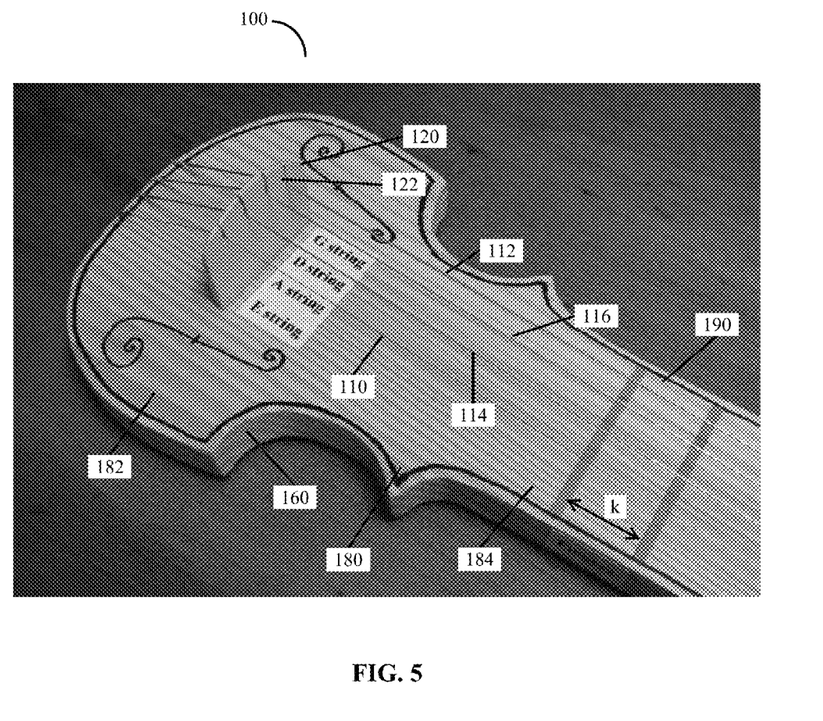
FIG. 5 is an upper perspective view of the exemplary hand exercise device of FIG. 1.

The first string 110 forms a substantial angle of inclination "θ" with respect to a direction "$x_1$". The direction "$x_1$" forms an angle 180 degrees with the direction "x". The angle of inclination "θ" can be adjusted by adjusting the height "h" of the support bridge, the distance "u" of the support bridge from the edge 108 or by adjusting the length of the base "L". An optimal angle of inclination "θ" enables sufficient exercise for optimal hand and finger strength when a user applies a pushing force on the first string 110. The pushing force on the first string 110 is applied opposite to the direction "y", toward the generally planar first surface 104. As best seen in FIG. 4, the angle of inclination "θ" in the illustrated embodiment is approximately 4.9 degrees. In some embodiments of the hand exercise device, the angle of inclination is between approximately 4 degrees and approximately 75 degrees. An angle less than approximately 4 degrees can result in insufficient exercise because of the first string being unwieldy, and an angle greater than approximately 75 degrees can result in very high exercise resistance, and may result in finger pain.

In some embodiments, the hand exercise device 100 further comprises a second string 112 connected to the base 102 by the fasteners 140. The second string 112 can be configured to develop a second string tension "S" when connected to the base 102. The second string tension "S" is a property of the material used for fabricating the second string 112. The second string 112 can have a second string thickness "b". The second string thickness "b" is larger than the first string thickness "a" in the illustrated embodiment. The second string 112 can be disposed at the substantial angle of inclination "θ" with respect to the first direction "x". The first and second strings 110 and 112 can have any desired cross-section. In the illustrated embodiment shown in FIG. 2, the first and second strings 110 and 112 are of circular cross-section with a diameter "a" and "b".

The first and second strings 110 and 112 can be of a material with sufficient elasticity to return to their initial distance "v" along the direction "y" when a force is applied, the force moving the first and second strings 110 and 112 toward the generally planar first surface 104 to a final position. The final position may be such that the strings are in contact with the generally planar first surface 104. Typical materials for fabricating the first and second strings 110 and 112 include polymers such as nylon, polyurethane, polyester, or similar materials. In some embodiments, the first and second strings 110 and 112 can be fabricated from animal intestines or tennis racquet strings or similar type of strings because of their resiliency and tendency to remain soft when under tension. The first and second strings 110 and 112 can also be fabricated such that they include a core of circular or hexagonal cross-section and a wire of circular or a rounded square cross-section that can be helically wound around the core. In such an embodiment, the core can be of a material such as steel or other metals, or nylon. The wire can be of metals such as steel or alloys. The first and second instruments can be recycled strings from a stringed musical instrument such as a violin.

In some embodiments of the hand exercise device 100, the first string 110 can travel a first distance "e" toward the generally planar first surface 104 from the initial distance "v" when a pushing force is applied on the first string 110, as shown in FIG. 4. The second string 112 can travel a second distance "f" toward the generally planar first surface 104 from the initial distance "v" when the same pushing force is applied on the second string 112. As illustrated in FIG. 4, the first distance "e" can be greater than the second distance "f". In such an embodiment, if a pushing force "O" is required to depress the first string 110 such that the first string 110 comes in contact with the generally planar first surface 104, a pushing force "N" is required to depress the second string 112 such that the second string 112 comes in contact with the generally planar first surface 104 as seen in FIGS. 7-10. In this embodiment, the pushing force "N" is greater than the pushing force "O". When a user performs hand exercises with the hand exercise device 100, this increased pushing force on the second string 112 is manifested as greater exercise resistance offered by the second string 112 than the first string 110.

In some embodiments of the hand exercise device 100, the support bridge 120 can include a groove to receive a designated string. In the illustrated embodiment, the groove 122 is shown as a slit. The groove 122 can have any desired cross-section, such as rectangular, square or semi-circular cross-section. The groove 122 can be cut or machined on the support bridge 120. The grooves are sized to receive one specific string; there are four grooves, one for each string in the illustrated embodiment. The size of the grooves can be chosen so that the string forms a snug fit in its groove and does not slide. As best shown in FIG. 2, the first and second string tensions "T" and "S" can facilitate the strings to be positioned in their groove so that they do not slide in the groove 122.

In some embodiments of the hand exercise device 100 the first and second string tensions "S" and "T" can be approximately equal. As mentioned elsewhere herein, the first and second string tensions "S" and "T" can be related to the elastic properties (e.g.: modulus of elasticity or similar quantities) of the material used for fabricating the first and second strings 110 and 112. In some embodiments of the hand exercise device 100, additional strings can be provided for exercise. In the illustrated embodiment, the hand exercise device includes a third string 114 and a fourth string 116. The third string 114 and the fourth string 116 can have thicknesses varying between the thickness of the first string, "a" and the thickness of the second string "b".

In some embodiments, the hand exercise device 100 further comprises a plurality of bumpers 150. The bumpers 150 can be positioned on the generally planar second surface 106 of the base 102. The bumpers 150 are illustrated as having a cylindrical shape in FIG. 3. They can be of any desired shape or size without loss of functionality. In the illustrated embodiment shown in FIG. 3, the bumpers 150 are of cylindrical shape with diameter approximately 1.3 centimeters. The bumpers 150 can be fabricated from polymeric materials such as neoprene, polycarbonate, silicone or vinyl pad protectors. The bumpers 150 can be connected to the generally planar second surface 106 by adhesives or mechanical means. During exercise, the hand exercise device 100 can be placed on an external surface such as a table. The bumpers 150 engage with the external surface by a frictional fit, and can prevent the hand exercise device 100 from sliding during the exercise. The bumpers 150 can also prevent any accidental damage to the external surface that may be caused by the hand exercise device (E.g.: scratching or abrasive contact).

In some embodiments, the hand exercise device 100 can include a flared portion 180. The flared portion 180 is positioned on the third surface 160 of the base 102. The flared portion 180 can be formed during the fabrication of the hand exercise device 100 by sawing, cutting or machining a blank material (E.g.: wooden board) to a shape such that the base 102 includes the flared portion 180. The flared portion 180 can offer additional support during hand exercise.

In some embodiments of the hand exercise device 100, the base 102 can include a body portion 182 and a neck portion 184. In some embodiments of the hand exercise device 100, the body portion 182 and the neck portion 184 can be generally coplanar. The neck portion 184 may be fabricated from a separate wooden board, or a similar material, and fastened to the body portion 182 by mechanical means or by using adhesives. Preferably, the body portion 182 and the neck portion 184 can be fabricated together as a single component to enhance ease of use of the device and enhanced support during exercise. For instance, the base 102 can be fabricated by sawing a wooden board to a specific shape. The body portion 182 can have a body portion width "c", and the neck portion 184 can have a neck portion width "d". The neck portion width "d" can be smaller than the body portion width "c". The body portion width "c" and the neck portion width "d" can vary along the length "L" of the base 102 as shown in the illustrated embodiment. The body portion width "c" and the neck portion width "d" can also remain constant along the length "L" of the base 102.

In some embodiments, the hand exercise device can include at least one exercise lane 190. The exercise lane 190 can be positioned on the planar first surface 104 of the base 102. The exercise lane 190 can be defined by marking the position of the exercise lane 190 on the base 102. The exercise lane can be marked on the planar first surface by visual indicators, dry erase markers, by adhesive stickers or similar means. The exercise lane 190 can have an exercise lane width "k" as marked in FIG. 4. The exercise lane 190 can be positioned at a distance "m" from the edge 108 of the planar first surface 104 on the base 102. In the illustrated embodiment best seen in FIG. 4, the exercise lane width "k" is approximately 2.5 centimeters. The distance "m" is approximately equal to 16 centimeters in the illustrated embodiment. The positioning of the exercise lane at the distance "m" can be changed to vary the exercise resistance. As mentioned elsewhere herein, exercise resistance is manifested as a result of the pushing force applied on a string to move the string to a specific distance, and increased exercise resistance is as a result of increased pushing force to move the string to the specific distance. In the illustrated embodiment, if the distance "m" is decreased, and/or the exercise lane is positioned closer to the edge 108, the exercise resistance is decreased, than if the distance "m" is increased, and/or the exercise lane is positioned away from the edge 108.

Figure 11:
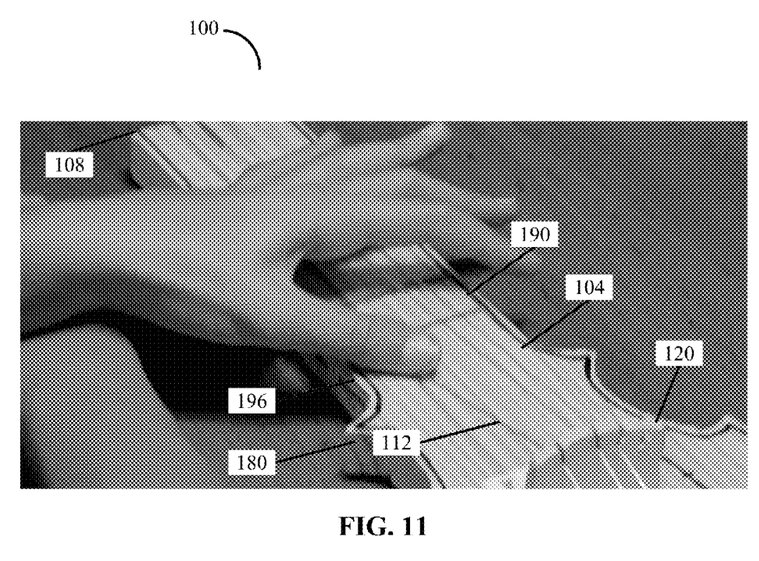
FIG. 11 is an upper perspective view of the exemplary hand exercise device of FIG. 1.

In some embodiments, the hand exercise device can include a plurality of exercise lanes. In the illustrated embodiment best seen in FIG. 4, the hand exercise device includes three exercise lanes. The first exercise lane 192 is located at a distance "$m_1$", the second exercise lane 194 is located at a distance "$m_2$" and the third exercise lane 196 is located at a distance "$m_3$" from the edge 108. It can be appreciated from FIGS. 4 and 11 that the first exercise lane 192 is the closest to the edge 108, and the third exercise lane 196 is the farthest from the edge 108. The exercise lanes can be marked on the planar first surface by visual indicators, dry erase markers, by adhesive stickers or similar means. Of the three exercise lanes, 192, 194 and 196, the first exercise lane 192 offers the least amount of exercise resistance, and the third exercise lane 196 offers the most amount of exercise resistance. In the illustrated embodiment best seen in FIG. 4, the distance "$m_1$" is approximately 13.5 centimeters, the distance "$m_2$" is approximately 16 centimeters and the distance "$m_3$" is approximately 18.5 centimeters.

Finger exercises involving applying a pushing force with a user's finger on any of the four strings 110, 112, 114 and 116 can be performed with the hand-exercise device 110. In the illustrated embodiments shown in FIGS. 1, 6, 7, 8 and 9, finger exercises can be performed using any of the four fingers of a user's hand at the exercise lane 190. In some embodiments of the hand exercise device, a pushing force can be applied on the first string 110 at the exercise lane 190. The pushing force can cause the first string 110 to move towards the generally planar first surface 104 of the base 102. An example exercise may include applying a pushing force so that the first string 110 may come in contact with the generally planar first surface 104 of the base 102. The pushing force can be increased to move the second string 112 to come in contact with the generally planar first surface 104. The increased pushing force on the second string is manifested as increased exercise resistance.

Example 1

Finger Exercise

An example exercise therapy can be performed with the hand exercise device 100. The hand exercise device 100 can be placed on a flat surface such as a table. A user can rest their wrist and arm up until the elbow on the table. If the exercise position does not offer adequate ergonomic comfort or support, the user may place the non-exercising hand under the wrist of the exercising hand. The strings can be labeled "E", "A", "D", and "G", starting from the thinnest string, and moving on to strings of increasing thickness. The "E" string can be the first string 110. The user can start exercising with the "E" string. The finger exercise can be performed by applying a pushing force on the strings at the exercise lane 190. The pushing force can be applied on the string so that the string is in contact with the generally planar first surface 104 at the exercise lane. The user may not lift their elbow or apply the pushing force by exerting it through their shoulder. The user may place their thumb in the flared portion 180. The user can apply the pushing force in the following sequence:

1) With the user's right hand, the user can place a first finger on string "E" and apply a generally downwardly directed first pushing force until the string touches the generally planar first surface 104 of the base 102.
2) The user can apply the pushing force for approximately one second.
3) The user can release the pushing force on the string and move their finger in a generally upwardly direction in approximately one second.
4) The user can perform repetitions of steps (1)-(3). The user can increase the number of repetitions of steps (1)-(3) by five every week.
5) The user can perform steps (1)-(4) with a second, third and fourth finger of their right hand.
6) The user can apply a generally downwardly directed second, third and fourth pushing forces on strings "A", "D" and "G". The user can apply the second, third and fourth pushing forces with the second, third and fourth fingers of their right hand.
7) The user can repeat steps (1)-(7) with a first, second, third and fourth fingers of their left hand.

Example 2

Thumb Exercise

Another example exercise therapy can be performed with the hand exercise device. The hand exercise device can be placed on a flat surface such as a table. A user can rest their wrist and arm till the elbow on the table. The user can place the non-exercising hand under the wrist the exercising hand. The user can perform the thumb exercises with the "G" string. A pushing force can be applied on the "G" string with the user's thumb on the right hand until the string is in contact with the generally planar first surface 104 at an exercise lane. The user's remaining four fingers may hover above the strings while the thumb exercise is being performed. The user may not lift their elbow or apply the pushing force by exerting it through their shoulder. The user can apply the pushing force in the following sequence:

1) The user can place their right thumb on string "G" and apply a generally downwardly directed first pushing force until the string touches the generally planar first surface 104 of the base 102 at the first exercise lane 192 illustrated in FIG. 4 with a picture of a circle, also known as the "circle lane".
2) The user can apply the pushing force for approximately one second.
3) The user can release the pushing force on the string and move their finger in a generally upwardly direction in approximately one second.
4) The user can repeat steps (1)-(3) on the second exercise lane 194 illustrated in FIG. 4 with a picture of a square, also known as the "square lane", and third exercise lane 196 illustrated in FIG. 4 with a picture of a star, also known as the "star lane", after performing the exercise on the first exercise lane 192.
5) The user can perform ten repetitions of steps (1)-(4). The user can increase the number of repetitions of steps (1)-(3) by five every week.
6) The user can perform steps (1)-(5) with their left thumb.

An example study that includes the example exercise therapy mentioned elsewhere herein was performed. 20 people over the age of 65 with osteoarthritis in the hands were chosen for this example study. The subjects of the study performed an exercise therapy plan that included the example finger and thumb exercises described above. The exercise therapy plan was followed by the subjects of the example study every day for four weeks. Grip strength was measured by hand dynamometer readings; hand function was measured by the QuickDASH Outcome Measure Questionnaire, and joint pain was measured by the Wong-Baker Faces Pain Rating Scale. In the study, the results demonstrated 95 percent of subjects improved grip strength (average percent improvement: 28 percent), 95 percent improved hand function (average percent improvement: 48 percent), and 70 percent improved in joint pain (average percent improvement: 48 percent) after using this hand exercise device as defined above every day for four weeks. According to scientific literature and orthopaedic experts, a study with a four week duration and 20 subjects is excellent in this specialized area of rehabilitative medicine. Therefore, this study is a valid representation of the benefits of this device. The exercise therapy and the example study does not limit the scope of the invention and serve as examples of ways in which exercises can be performed by the user for beneficial effect.

An exemplary hand exercise device of the present invention can encourage a user to perform hand exercises every day. The exercise program comprising applying a pushing force on a string can be interesting and motivate the user to perform exercises regularly, unlike other hand exercise devices. For example, other hand exercise devices may involve squeezing a compressive sphere or pushing on compression springs. Such exercises may not be interactive and captivating to a user. Therapists often face the problem of minimal or no compliance from patients in completing directed exercises every day. The hand exercise device of the present invention addresses the problem encountered by therapists by encouraging users to exercise according to a predetermined exercise plan.

Additional advantages and modifications will readily occur to those skilled in the art. The invention in its broader aspects is, therefore, not limited to the specific details, representative apparatus and illustrative examples shown and described. Accordingly, departures from such details may be made without departing from the spirit or scope of the applicant's general inventive concept.

What is claimed is:

1. A hand exercise device, comprising:
a base that includes a generally planar first surface, a generally planar second surface and a third surface, the generally planar first surface and the generally planar second surface being parallel and opposite to each other, the third surface being positioned laterally between the generally planar first surface and the generally planar second surface of the base, the base having a first edge and a second edge opposite to the first edge;
a plurality of fasteners supported by the base;
a first string having a first end and a second end opposite to the first end, the first end being connected to the base by the fasteners on the third surface proximal to the first edge of the base, and the second end being connected to the second surface of the base proximal to the second edge, such that the first string develops a first string tension when connected to the base by the fasteners;
a second string having a first end and a second end opposite to the first end, the first end of the second string being connected to the base by the fasteners on the third surface proximal to the first edge of the base, and the second end of the second string being connected to the second surface of the base proximal to the second edge, such that the second string develops a second string tension when connected to the base, the first and second tensions being about equal, the first and second strings each being configured for contact the planar first surface when a force is applied thereon;
a support bridge coupled to the base on the generally planar first surface, the support bridge being positioned at a first distance from the base in a first direction such that the first and second strings are held at a first distance from the base in a second direction;
the positioning of the first string and second strings on the support bridge forming an angle of inclination with respect to the planar first surface, and
the first direction and the second direction separated by an angle of approximately 90 degrees, the angle of inclination with respect to the planar first surface is between about 4 degrees and about 75 degrees.

2. The hand exercise device of claim 1, wherein the second string has a second string thickness, the second string thickness being larger than the first string thickness, the second string being disposed at the substantial angle of inclination with respect to the first direction.

3. The hand exercise device of claim 2, wherein the first and second strings are of a material with sufficient elasticity to return to an initial position when a force is applied, the force moving the first and second strings from the initial position to a final position.

4. The hand exercise device of claim 3, wherein the first string is adapted to move a first depth from the initial position when a pushing force is applied on the first string, the second string moves a second depth from the initial position when the pushing force is applied on the second string, the first depth being greater than the second depth.

5. The hand exercise device of claim 2, wherein the support bridge comprises a groove to receive the first string and the second string, the first string tension and the second string facilitating the strings to be positioned in their designated groove.

6. The hand exercise device of claim 1 further comprising, a third string and a fourth string supported by the support bridge, the third string and the fourth string having a third string tension and fourth string tension, the third and fourth string tensions being equal to the first string tension, the third and fourth strings being disposed at the substantial angle of inclination with respect to the first direction.

7. The hand exercise device of claim 6, wherein the third string having a third string thickness less than the second string thickness and the fourth string having a fourth string thickness less than the third string thickness.

8. The hand exercise device of claim 1 further comprising, a plurality of bumpers, the bumpers being positioned on the generally planar second surface of the base.

9. The hand exercise device of claim 1, wherein the connection of the first and second strings at the first end being defined along a single edge on the third surface, and the connection of the first and second strings at the second end being defined along a single edge on the second surface such that each of the first and second strings have a length between the first and second edges of the base that is about equal.

10. A hand exercise device, comprising:
a base that includes a generally planar first surface, a generally planar second surface and a third surface, the generally planar first surface and the generally planar second surface being parallel and opposite to each other, the third surface being positioned laterally between the generally planar first surface and the generally planar second surface of the base, the base having a first edge and a second edge opposite to the first edge;
a plurality of fasteners supported by the base;

a first string having a first end and a second end opposite to the first end, the first end being connected to the base by the fasteners on the third surface proximal to the first edge of the base, and the second end being connected to the second surface of the base proximal to the second edge, such that the first string develops a first string tension when connected to the base by the fasteners;

a support bridge coupled to the base on the generally planar first surface, the support bridge being positioned at a first distance from the base in a first direction such that the first string is are held at a first distance from the base in a second direction, the positioning of the first string on the support bridge forming an angle of inclination with respect to the planar first surface, the first direction and the second direction separated by an angle of approximately 90 degrees, the angle of inclination with respect to the planar first surface is between about 4 degrees and about 75 degrees; and at least one exercise lane positioned on the planar first surface of the base, the exercise lane corresponding to a portion of the planar first surface of the base over which a finger or thumb exercise is performed by a user, the first string providing an exercise resistance over the exercise lane due to the first string tension such that the first string contacts the planar first surface within the exercise lane when a pushing force is applied, and the first string moving away from the planar first surface when the pushing force is released.

11. The hand exercise device of claim 10, wherein the exercise lane has an exercise lane width defined along the first direction, the exercise lane width being substantially less than a distance between the support bridge and an edge of the base opposite to the support bridge.

12. The hand exercise of claim 10, wherein the base includes a body portion and a neck portion, the body portion having a body portion width, and the neck portion having a neck portion width, the neck portion width being smaller than the body portion width.

13. The hand exercise device of claim 12, wherein the body portion and the neck portion are generally coplanar.

14. The hand exercise device of claim 13, wherein the exercise lane is positioned at a location corresponding to a transition between the body portion and the neck portion.

15. The hand exercise device of claim 14 further comprising, a flared portion positioned at the transition between the body portion and the neck portion, the flared portion flaring outwardly away from a widthwise direction, the flared portion providing support during hand exercise.

* * * * *